United States Patent [19]  [11]  4,308,288
Hara et al.  [45]  Dec. 29, 1981

[54] METHOD OF PRODUCING GRANULAR COCOA

[75] Inventors: Jun Hara, Tokyo; Masao Takeuchi, Fukuroi; Takeshi Morishima, Yokosuka, all of Japan

[73] Assignee: Morinaga & Company, Limited, Tokyo, Japan

[21] Appl. No.: 128,508

[22] Filed: Mar. 10, 1980

[30] Foreign Application Priority Data

Dec. 7, 1979 [JP] Japan ................. 54-158903

[51] Int. Cl.$^3$ .............................................. A23G 1/00
[52] U.S. Cl. ................................. 426/285; 426/631
[58] Field of Search ............ 426/631, 453, 285, 516, 426/512, 518, 419

[56] References Cited

U.S. PATENT DOCUMENTS 2,889,225  6/1959  Palik .................................. 426/631
3,053,663  9/1962  Donahue .......................... 426/453

Primary Examiner—Hiram Bernstein
Attorney, Agent, or Firm—Oblon, Fisher, Spivak, McClelland & Maier

[57]  ABSTRACT

Improved granular cocoa which is sufficiently dense and stiff but nevertheless is readily soluble in water, even in cold water, can be produced without using any binder by subjecting a cocoa powder of which fat content is 12-29% to compression, feeding the compressed powder to a roller press thereby forming small plate-like agglomerates which are 0.5-3 mm thick, and crushing and sifting the agglomerates to obtain 10-30 mesh granules of cocoa. The physical properties of the cocoa granules are further improved by ageing the granules at temperatures below about 27° C., most preferably at 15-25° C., for a few hours to several days. the starting cocoa powder may have been added with powdered sugar and/or milk.

9 Claims, No Drawings

METHOD OF PRODUCING GRANULAR COCOA

BACKGROUND OF THE INVENTION

This invention relates to a method of producing granular cocoa which is easily soluble in water to give a hot or cold cocoa drink.

Cocoa powder is obtained fundamentally through the procedures of crushing and winnowing roasted cocoa beans to give so-called cocoa nibs, grinding the nibs to give a slurry called chocolate liquor or cacao mass, passing this slurry through special filter presses to squeeze out extra fat and pulverizing the resulting filtercake, followed by sifting.

As matters of inconvenience during a final stage of the production procedures, cocoa powder is rather low in fluidity and tends to be suspended in the atmosphere to produce a dust cloud, sometimes threatening to result in a dust explosion. Besides, cocoa powder is not readily soluble in water and hence offers inconveniences to the consumers. To prepare hot cocoa without forming undissolved lumps of cocoa powder, it is necessary to take the steps of first pouring a small quantity of hot water on cocoa powder, followed by thorough kneading to obtain a smooth paste, and then adding a larger quantity of hot water and/or hot milk, with enough stirring to achieve satisfactory dispersion and dissolution of the cocoa powder particles. When cold cocoa drink is wanted, it is necessary to cool hot cocoa prepared through these steps since it is very difficult to well disperse and dissolve cocoa powder in cold water and/or milk.

It is well known and industrially in practice to granulate a fine powder material for the purpose of improving the fluidity of the material, preventing the occurrence of dust cloud or enhancing the dispersing and dissolving property. However, granulation of cocoa powder by any of conventional granulating methods, such as tumbling granulation, extrusion granulation, fluidized bed granulation and the use of a so-called instantizer, which are applicable to various kinds of powder materials has been impracticable because of insufficiency in the dissolving and dispersing property of the resulting cocoa granules. This problem can be solved to a considerable extent by a granulating method wherein cocoa butter and a surfactant are added to and mixed with cacao mass and the paste-like mixture is forced through a wire screen, followed by drying. However, a granular cocoa obtained by this method has a disadvantage that when the granular cocoa is dissolved and dispersed in hot water a large number of glaring oil droplets appear on the surface of the cocoa liquid and give an unpleasant feeling. Besides, this granulating method needs to comprise a tempering procedure and requires skill.

SUMMARY OF THE INVENTION

It is an object of the present invention to provide a novel method of producing granular cocoa, which method is easy to put into industrial practice and effective both in precluding occurrence of dust cloud during production procedures and in improving fluidity of the material under and after treatment and gives cocoa granules which can easily and quickly be dissolved and dispersed in water, even in cold water, without forming undissolved lumps of cocoa.

According to the present invention, granular cocoa is produced through the following steps. First a cocoa powder of which fat content is in the range from 12 to 29% by weight is subjected to such an extent of compression, for example, by means of a compression apparatus of the screw type, that the cocoa powder exhibits an appreciable increase in bulk density but still remains in powder form. Then the cocoa powder in the compressed state is fed to a roller press such that a pair of rolls of the roller press force the individual particles of the cocoa powder to strongly cohere to one another thereby forming small, plate-like and about 0.5–3 mm thick agglomerates of the cocoa powder. These plate-like agglomerates are crushed and sifted to obtain cocoa granules which are between 10 and 30 mesh in size.

Preferably the thus produced cocoa granules are allowed to age by keeping the cocoa granules at temperatures below about 27° C., and more preferably at 15°–25° C., for a period of about three hours to several days.

The granulating method according to the invention is applicable not only to pure cocoa powder entirely prepared from cacao mass but also to an adjusted cocoa powder which has been added with sugar, or a substitute sugar, and/or powdered milk.

DESCRIPTION OF THE PREFERRED EMBODIMENTS

Principally, the present invention is based on our discovery that fine particles of cocoa powder can be forced to strongly adhere or cohere to one another by initially compressing the powder to a certain extent and then passing the compressed cocoa powder (while in the compressed state) through rolls of a roller press so as to form small and thin plate-like agglomerates. By crushing these agglomerates, followed by sifting, cocoa granules of desired sizes and excellent physical properties can easily be obtained.

Cocoa powder is low in bulk density, that is, small in weight per unit volume. Therefore, if it is intended to agglomerate cocoa powder to form sufficiently dense and stiff plate-like blocks by passing the powder through rolls with no pre-treatment, the intention can hardly be realized primarily because it is very difficult to feed a sufficient quantity of cocoa powder per unit time to the rolls and, hence, the individual fine particles of the powder are not forced to strongly cohere to one another.

In the method of the present invention, cocoa powder is first compressed by means of a compressing apparatus such as a screw extruder to such an extent that the powder undergoes an appreciable increase in its weight per unit volume but still remains in powder form. Then, while in the compressed state, the cocoa powder is fed to a roller press and forced to pass through a pair of rolls which are, as usual, arranged parallel and turning in opposite directions. By this technique a sufficiently large quantity of cocoa powder can be fed to the rolls at a stretch or during each unit time, so that the individual particles of cocoa are well compressed against one another and forced to strongly cohere to one another with the result that thin plate-like agglomerates are formed.

If use is made of a cocoa powder too low in fat content, forced cohesion of the cocoa powder particles during the agglomerating procedure remains insufficient so that cocoa granules obtained through the succeeding crushing and sifting procedures are insufficient in stiffness and are liable to crumble. However, the use of a cocoa powder too high in fat content is also unfavorable because when the granulated cocoa is dispersed and dissolved in hot water oil droplets appear on the surface of the cocoa liquid and give unpleasant feeling. Therefore, the present invention requires to use a cocoa powder of which fat content is in the range from 12 to 29% by weight.

When the small plate-like agglomerates are too small in thickness, the resultant cocoa granules become excessively dense and stiff ones which are inferior in the property of dissolving and dispersing in water. On the other hand, the formation of too thick plate-like agglomerates of cocoa powder results in that the coehsion of the cocoa particles remain insufficient and/or occurs non-uniformly and, therefore, that the finally obtained cocoa granules are irregular in hardness and liable to crumble. Accordingly it is imporant to form small plate-like agglomerates of cocoa powder into thicknesses of 0.5–3 mm by appropriate adjustment of the rolling operation factors such as the extent of compression cocoa powder before its feed to the rolls, the rates of rotation of the rolls and the rolling pressure.

The small, thin and plate-like agglomerates of cocoa powder are subjected to crushing and sifting procedures to obtain cocoa granules which are between 10 and 30 mesh (ASTM standard sieves) in size. Cocoa granules larger in size are inconvenient to handle with a spoon or the like, but cocoa granules smaller than 30 mesh lose most of the advantages of granular cocoa. In the present invention, therefore, the cocoa granules are made to be between 10 and 30 mesh in size.

Highly preferably, the method of the invention includes an ageing process wherein the granulated cocoa is allowed to age by keeping it at temperatures below about 27° C., and more preferably at 15°–25° C., for a period of a few hours at the shortest and several days at the longest. As favorable effects of this ageing process, the cocoa granules become sufficiently dense and stiff, meaning that the individual cocoa particles in each grain become quite strongly cohered to one another, and nevertheless the granules become further easily soluble in water. Besides, the aged cocoa granules have a very desirable color.

Thus the present invention makes it possible to granulate cocoa powder without the addition of any binder, water or any other auxiliary additive, that is, to obtain a granular cocoa consisting of pure cocoa. Moreover, this invention can provide cocoa granules which do not easily crumble during handling in dry state but are excellent in the property of being dissolved and dispersed in water in spite of the use of no surfactant in the granulating process. The dispersion and dissolution property of granular cocoa produced by a method of the invention can be controlled by controlling the thickness of the small plate-like agglomerates of cocoa powder (within the aforementioned range of 0.5–3 mm). Furthermore, the granulating method of the invention becomes a solution to the problem of low fluidity of cocoa powder and greatly contributes to the preclusion of dust clouds in cocoa powder plants. Of course, dissolution of granular cocoa produced according to the invention is not accompanied by the appearance of oil droplets on the surface of the cocoa liquid.

The following examples are presented to illustrate the present invention.

EXAMPLE 1

A roller press was located adjacent the outlet of a screw extruder. A pure cocoa powder, of which fat content was 22%, was charged into the hopper of the extruder and compressed by the screw. The cocoa powder extruded from the screw extruder in a compressed state was directly fed to the roller press such that the rolls forced the compressed powder to become small and 1.2 mm thick plate-like agglomerates. These agglomerates were crushed by means of a crusher into smaller granules, which were sifted through sieves to obtain cocoa granules between 16 and 24 mesh. These cocoa granules were kept at 21° C. for 48 hr thereby accomplishing ageing.

The thus produced granular cocoa and a conventional cocoa powder (on the market) containing 22% fat were subjected to a comparative test to examine easiness of dispersing and dissolving each sample in cold or hot water. In this test, 5 g of each cocoa sample was poured into water contained in a 200 ml beaker and kept at a predetermined temperature (20° C., 60° C. or 80° C.), and the amount of time elapsed until wetting and submerging of the entire sample was measured, without agitating the water in the beaker. The following table presents the result of this test, demonstrating distinct superiority of the granular cocoa (of Example 1) in the dispersing and dissolving property.

| Temp. of Water | Granular Cocoa of Example 1 | Conventional Cocoa Powder |
| --- | --- | --- |
| 20° C. | 15 sec | more than 1 hr*[1] |
| 60° C. | 0 sec*[2] | 2 min |
| 80° C. | 0 sec*[2] | 40 sec |

*[1] complete submerging did not occur even 1 hr had elapsed: stirred thereafter, but a portion of the sample still floated on the water surface.
*[2] dissolved and dispersed instantaneously.

EXAMPLE 2

Using the extruding and rolling apparatus of Example 1, a pure cocoa powder containing 16% fat was compressed in the screw extruder and directly (in a compressed state) fed to the rolls to form small and 0.8 mm thick plate-like agglomerates of the cocoa powder. These plate-like agglomerates were crushed and sifted to obtain cocoa granules between 22 and 28 mesh. The thus obtained cocoa granules were allowed to age by keeping them in a chamber maintained at 18°–22° C. for 24 hr. As the result, granular cocoa of excellent physical properties was obtained.

EXAMPLE 3

A pure cocoa powder containing 26% fat was treated in accordance with Example 1 to form small and plate-like agglomerates of the cocoa powder which were 1.8–2.0 mm in thickness. The plate-like agglomerates were crushed and sifted into cocoa granules 16–24 mesh in size. The production of a granular cocoa was completed by ageing these cocoa granules first at 24° C. for 3 hr and thereafter at 16° C. for 24 hr. The product of this example, too, exhibited excellent properties.

EXAMPLE 4

A chocolate powder was prepared by mixing 36 kg of a pure cocoa powder containing 24% fat and 64 kg of powdered sugar. By the apparatus and procedures of Example 1, this chocolate powder was forced to become small and 1.2 mm thick plate-like agglomerates, which were crushed and sifted into granules between 16 and 24 mesh in size. A granular chocolate of excellent properties was obtained by ageing the granules at 18° C. for 12 hr.

EXAMPLE 5

A drink chocolate powder was prepared by mixing 30 kg of pure cocoa powder containing 24% fat with 70 kg of powdered sugar. This chocolate powder was treated in accordance with Example 4 to obtain granules between 16 and 24 mesh. The production of a granular drink chocolate was completed by keeping the granules at 18° C. for 4 days.

EXAMPLE 6

By the apparatus and procedures of Example 1, an instant chocolate powder prepared by mixing 20 kg of pure cocoa powder containing 24% fat, 30 kg of powdered whole milk and 50 kg of powdered sugar was granulated into granules which were between 16 and 24 mesh in size. Through the aging process of Example 1, these granules excellent properties as a granular instant chocolate.

EXAMPLE 7

A cocoa powder mix was prepared by adding 25 kg of powdered whole milk, 57 kg of powdered sugar and small amounts of a flavoring and a viscosity adjusting agent to 18 kg of pure cocoa powder containing 18% fat and subjected to the granulating and aging procedures of Example 1. Obtained as the result was a granular instant cocoa of excellent properties.

What is claimed is:

1. A method of producing a granular cocoa, comprising the steps of:

subjecting a cocoa powder of which fat content is in the range from 12 to 29% by weight to such an extent of compression that said cocoa powder exhibits an appreciable increase in bulk density but still remains in powder form;

feeding said cocoa powder in the compressed state to a roller press such that a pair of rolls of said roller press force the individual particles of said cocoa powder to strongly cohere to one another thereby forming small plate-like agglomerates of said cocoa powder, each of said plate-like agglomerates being about 0.5 mm to about 3 mm in thickness; and crushing and sifting said plate-like agglomerates so as to obtain cocoa granules which are between 10 and 30 mesh in size.

2. A method according to claim 1, further comprising the step of ageing said cocoa granules by keeping said cocoa granules at temperatures below about 27° C. at least for a period of 3 hours.

3. A method according to claim 2, wherein said cocoa granules in the ageing step are kept at temperatures in the range from about 15° C. to about 25° C.

4. A method according to claim 2, wherein the ageing step is continued at least for a period of 24 hours.

5. A method according to claims 1 or 2, wherein said cocoa powder is a pure cocoa powder.

6. A method according to claims 1 or 2, wherein said cocoa powder is added with a sweetner.

7. A method according to claim 6, wherein said sweetner is powdered sugar.

8. A method according to claim 6, wherein said cocoa powder is further added with powdered milk.

9. A method according to claim 1, wherein the first stated step is performed by means of a compressing apparatus of the type having a screw the turning of which screw exerts compressional force on a powdery material fed to the apparatus.

* * * * *